United States Patent [19]

Bellew

[11] 4,010,284
[45] Mar. 1, 1977

[54] METHOD FOR FORMING NUT CLUSTER CONFECTIONS AND THE LIKE

[75] Inventor: Lawrence Bellew, Secane, Pa.
[73] Assignee: W. C. Smith & Sons, Inc., Philadelphia, Pa.
[22] Filed: Aug. 28, 1975
[21] Appl. No.: 608,737

Related U.S. Application Data

[62] Division of Ser. No. 357,013, May 3, 1973, Pat. No. 3,918,862.
[52] U.S. Cl. .............................. 426/285; 426/307; 426/516; 426/519; 426/660
[51] Int. Cl.² .......................................... A23L 1/09
[58] Field of Search .......... 426/285, 519, 306, 307, 426/632, 629, 660, 515, 516, 517, 631, 389 426/93, 103

[56] References Cited

UNITED STATES PATENTS

| | | | |
|---|---|---|---|
| 2,515,150 | 7/1950 | Aasted | 426/660 X |
| 2,847,311 | 8/1958 | Doumak et al. | 426/516 X |
| 2,858,217 | 10/1958 | Benson | 426/93 |
| 2,870,026 | 1/1959 | Keller et al. | 426/519 X |
| 3,307,503 | 3/1967 | Elmer et al. | 426/516 |
| 3,642,489 | 2/1972 | Barbley et al. | 426/516 X |
| 3,868,471 | 2/1975 | Decelles et al. | 426/93 X |
| 3,890,453 | 6/1975 | Harmon et al. | 426/516 X |

OTHER PUBLICATIONS

The Good Housekeeping Cookbook; Publisher: Good Housekeeping Books, New York, New York; Z. Coulson (Editor); 1973 pp. 508, 562, 563.

Primary Examiner—Robert L. Lindsay, Jr.
Assistant Examiner—Kenneth M. Schor
Attorney, Agent, or Firm—Leydig, Voit, Osann, Mayer & Holt,

[57] ABSTRACT

A method and apparatus for automatically and continuously making solid filled confections, such as chocolate nut clusters, which have an irregular homemade appearance. The illustrated machine includes a plurality of extrusion tubes each having a screw type auger, a supply for separate streams of nuts and hot fluid chocolate into each extrusion tube, elements for rotating and oscillating the auger to thoroughly mix the fluid chocolate and nuts that are introduced into the tube and transfer the mixture to an extrusion orifice, and reciprocatable cutting blades located adjacent the extrusion orifice of each extrusion tube for successively cutting the extruded mixture into discrete pieces of predetermined size which thereupon drop onto a moving conveyor surface below.

6 Claims, 7 Drawing Figures

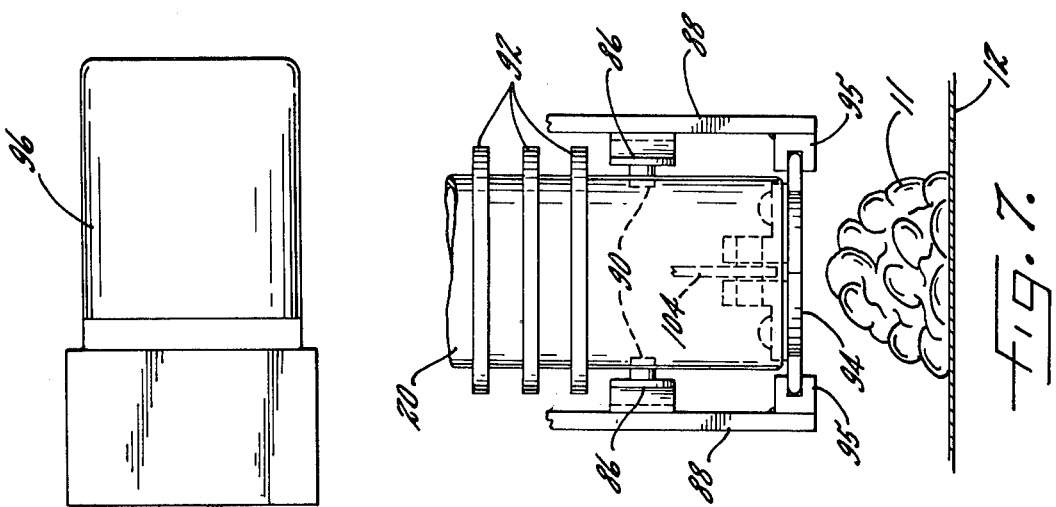
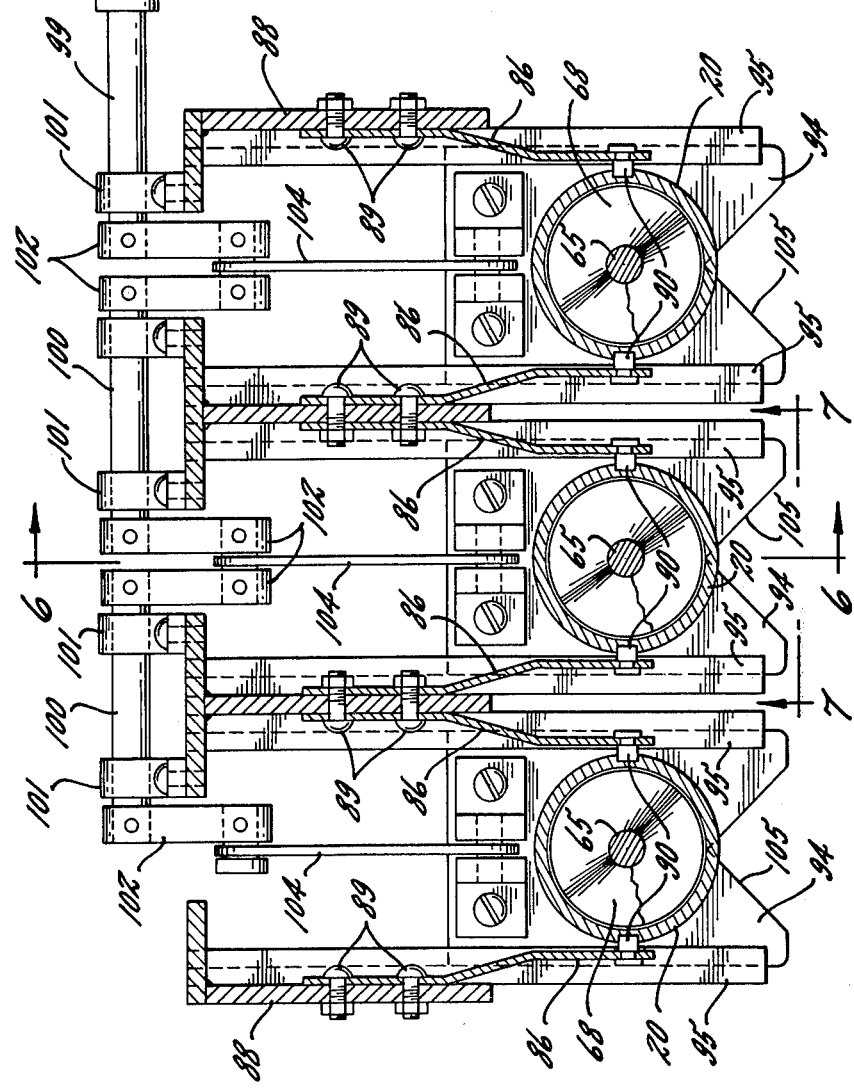

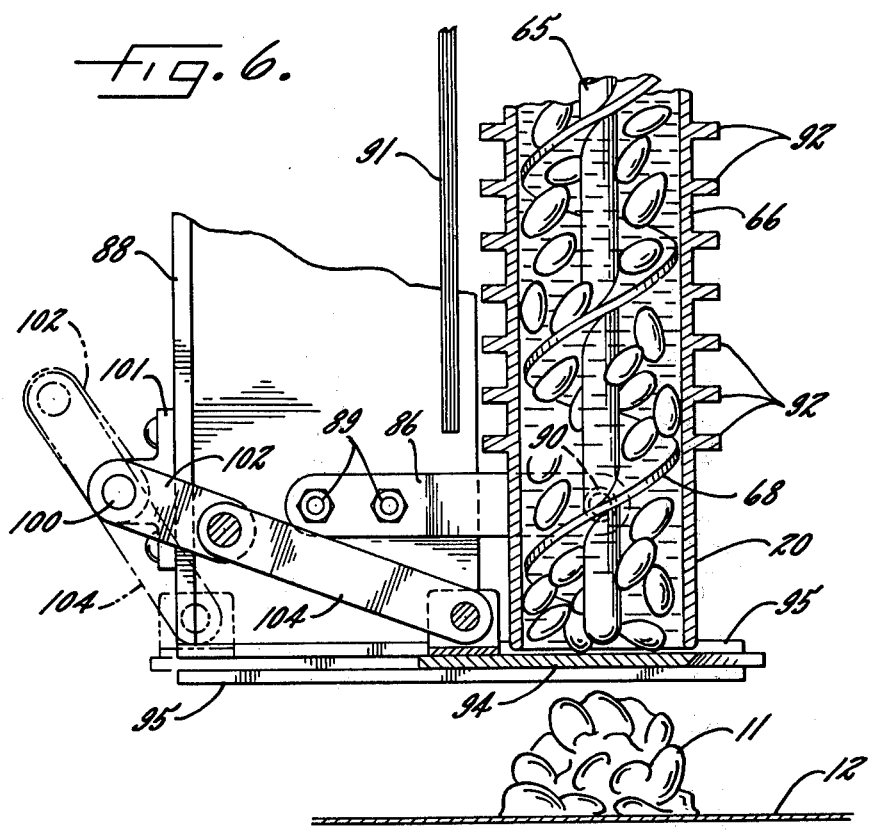

METHOD FOR FORMING NUT CLUSTER CONFECTIONS AND THE LIKE

This is a division of application Ser. No. 357,013, filed May 3, 1973 and now U.S. Pat. No. 3,918,862.

DESCRIPTION OF THE INVENTION

The present invention relates to a method for producing confections, such as nut clusters, which comprise solid fillers and a fluid binder that sets upon cooling.

Confections such as nut clusters generally are hand made by mixing the solid filler with molten chocolate and hand depositing the cluster in free forms on wax paper or similar release surfaces for cooling. The nut cluster, which is the most common of this type of confection, consists of about one-third to two-thirds by weight of whole or broken nuts, usually peanuts. Other solid fillers used in such candies are pecans, almonds, raisins, coconut shreds and the like. Such clusters are characterized by their highly irregular surface where the nuts or solids protrude under the chocolate covering with slightly varying shapes about the perimeter.

Since it has been necessary to hand make these cluster type confections in order to achieve the free form of irregular shape, their manufacture has been laborious and relatively expensive. Various attempts have been made to develop machines for automatically manufacturing such confections, but these prior machines have had various drawbacks. In some current machines which produce nut clusters by depositing the solid filler and molten chocolate into molds for cooling, the resulting confection has a smooth outer shape. While some machines have utilized molds having a relatively irregular molding surface, nevertheless the formed confection is easily recognized as a molded product, rather than a free formed product. The free form or homemade appearance of this type of confection has been found to be significantly more desirable from a merchandizing standpoint than the molded form. Moreover, present molding machines also have incurred problems in adequately mixing the solids with the chocolate and in properly tempering the chocolate during the process.

It is an object of the present invention to provide a method for efficiently and continuously producing solid filled confections of uniform size and with a free form or homemade appearance. A related object is to provide such a method which is completely automated and does not utilize molds.

Another object is to provide a method as characterized above in which the temperature of the molten chocolate, the ratio of the solids to the chocolate, and the size of the clusters may be selectively varied during production.

Other objects and advantages of the invention will become apparent upon reading the following detailed description and upon reference to the drawings, in which.

Figure 1:
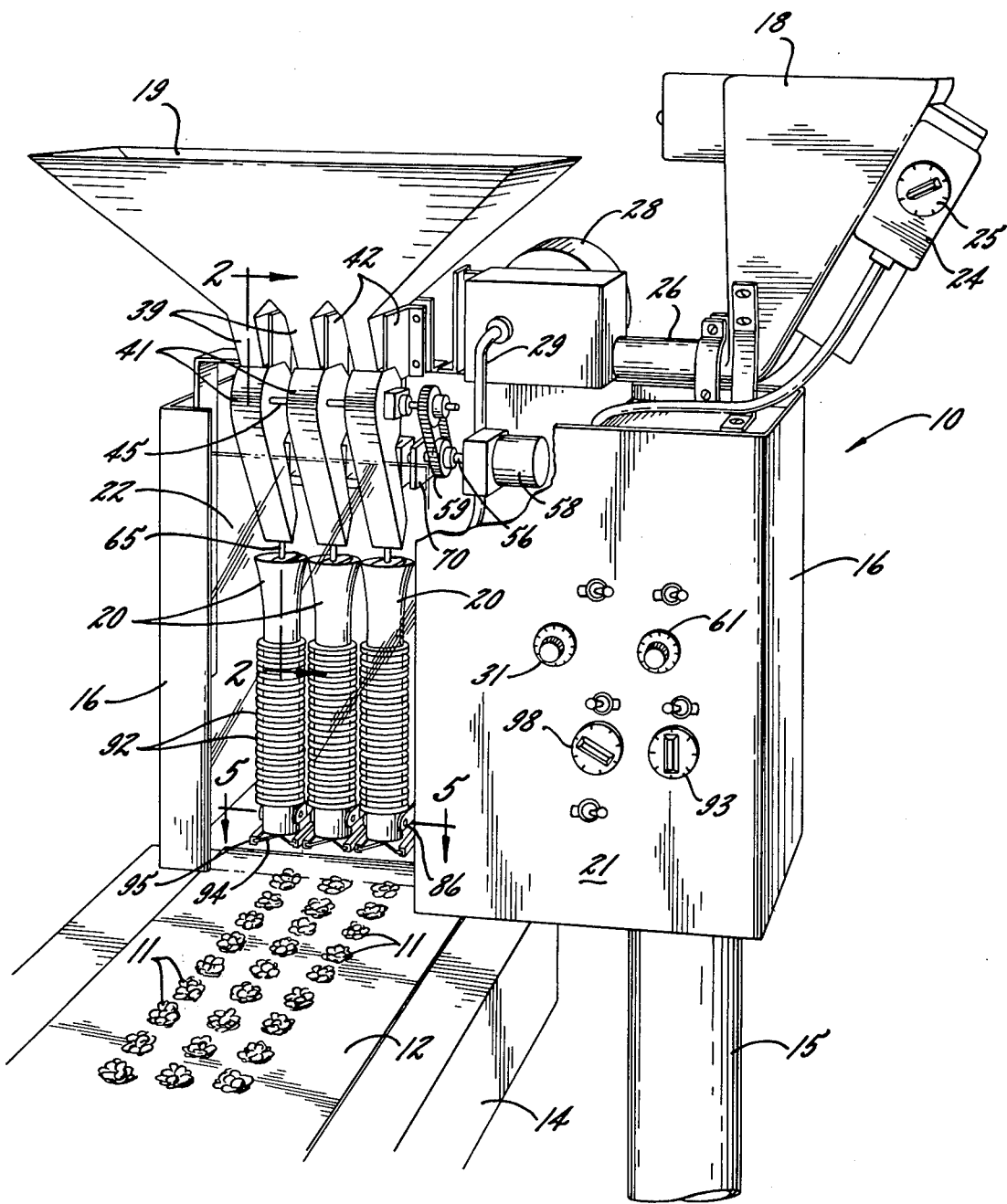
FIG. 1 is a perspective of a confection machine embodying the present invention, shown producing nut cluster type confections and depositing them on a separate run out conveyor.
Figure 2:
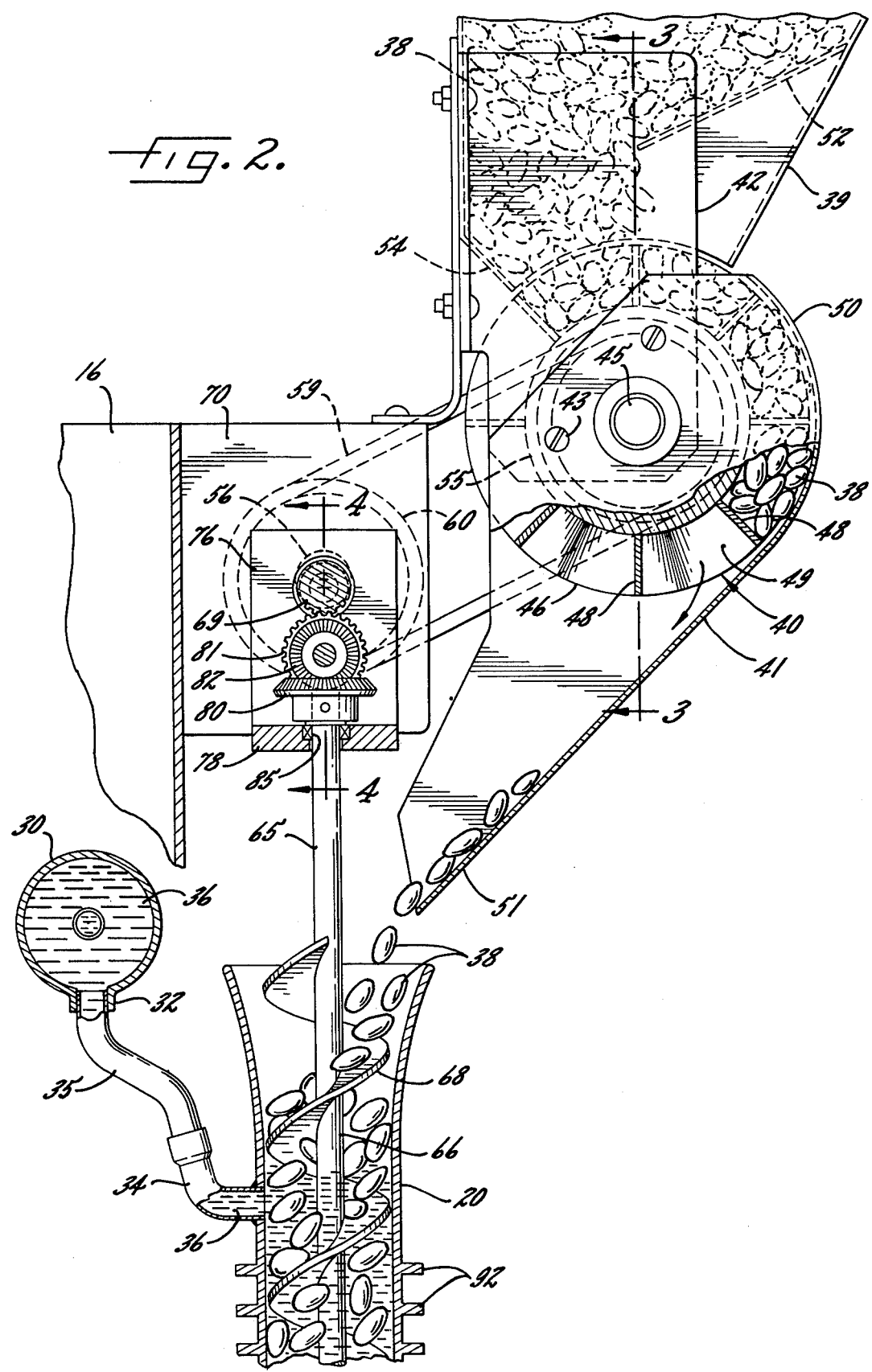
FIG. 2 is an enlarged partially diagrammatic fragmentary section taken in the plane of line 2—2 in FIG. 1.
Figure 3:
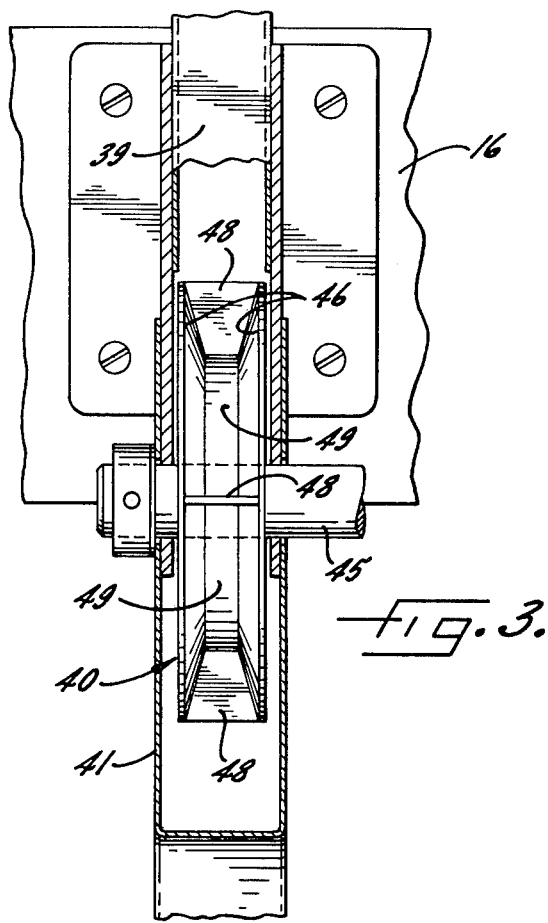
Figure 4:
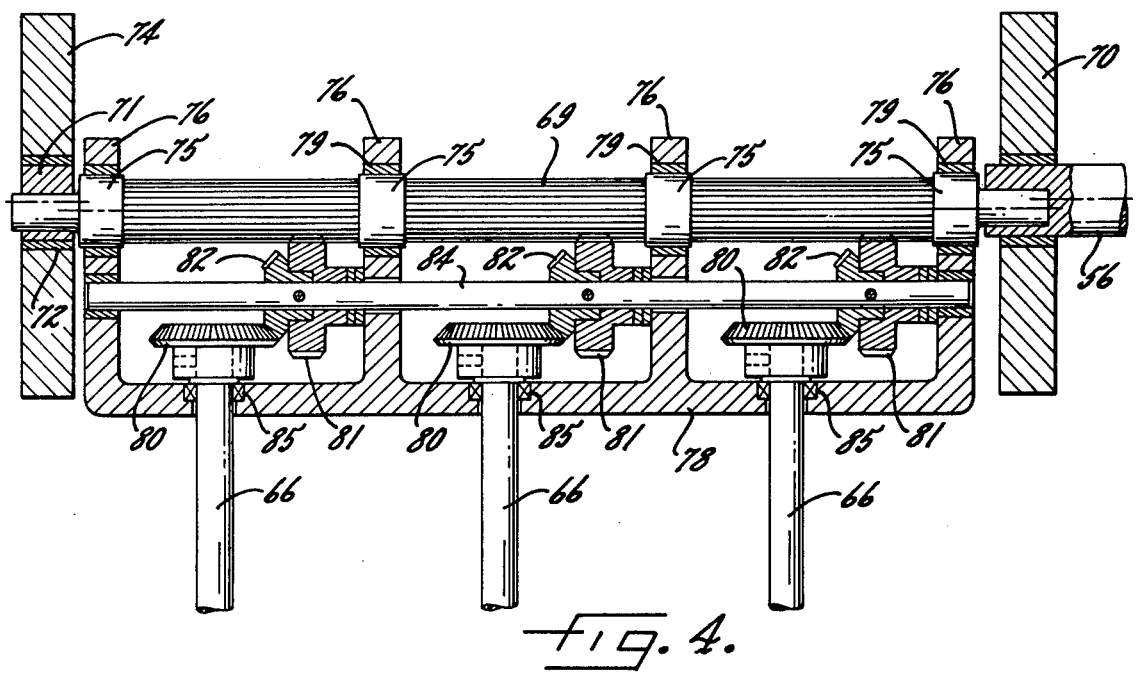

FIGS. 3 and 4 are fragmentary sections taken in the plane of lines 3—3 and 4—4 in FIG. 2, respectively;

FIG. 5 is an enlarged fragmentary section taken in the plane of line 5—5 in FIG. 1;

FIG. 6 is a fragmentary section taken in the plane of line 6—6 in FIG. 5 showing one of the extrusion cutting blades in its cutting position in solid lines and in its retracted position in phantom; and FIG. 7 is an enlarged partial end view of the extrusion cut off mechanism of the machine, taken in the plane of line 7—7 in FIG. 5.

While the invention is susceptible of various modifications and alternative constructions, a certain illustrative embodiment has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention.

Referring now more particularly to FIG. 1 of the drawings, the invention is there embodied in an illustrative machine 10 adapted to continuously form and deposit solid filled cluster type confections 11 on a moving belt 12 of an independent conveyor 14 of a conventional type. While the machine 10 will be described in connection with the production of confections of a type commonly known as "chocolate nut clusters", it will be understood that it may be used to produce other kinds of confections or the like which comprise a solid filler and a fluid binder that sets when cooled.

The illustrated machine 10 includes an upstanding post 15 with a frame 16 extending in cantilever fashion from the top of the post over the run out conveyor 14. Supported by the frame 16 is a chocolate receiving tank 18, a nut or other solid supply trough 19, and a plurality of vertically disposed extrusion tubes 20 which receive fluid chocolate and solids from the tank 18 and trough 19 and extrude the clusters 11 onto the run out conveyor belt 12. The frame 16 in this case has a front control panel 21 and a front opening with a transparent hinge mounted door 22 that permits accessibility to the extrusion tubes 20. The support post 15 may be mounted on a suitable wheeled or caster base so as to enable the machine to be readily moved to and from the working position adjacent the conveyor 14.

To provide the receiving tank 18 with a continuous supply of hot liquid chocolate, the tank 18 preferably is connected to the outlet (not shown) of a suitable chocolate tempering apparatus, such as shown in U.S. Pat. No. 3,777,807. The proper temperature and viscosity of the chocolate within the receiving tank 18 may be maintained by a selectively adjustable temperature control device 24 regulated by a dial 25.

In accordance with the present invention, means are provided for continuously and separately feeding controlled quantities of solids and fluid chocolate into the extrusion tubes, thoroughly mixing the fluid chocolate and solids within the extrusion tubes and extruding the mixtures out lower orifices therein with the chocolate having desired characteristics, and severing the extrusions into predetermined sized clusters which have free formed, irregular shapes. To this end, the lower end of the chocolate receiving tank 18 has an outlet tube 26 connected to a pump 28, that in turn is connected through a line 29 to a common manifold 30 for the extrusion tubes 20, as best shown in FIGS. 1 and 2. The pump 28, which may be of a type commonly known as "peristaltic", receives fluid chocolate from the tank outlet tube 26 and directs it under pressure to the manifold 30. The pump 28 preferably has a variable speed drive that is operated by a dial 31 on the control panel 21. The manifold 30 is supported by the frame 16 at an elevation slightly above the extrusion tubes 20, which in the illustrated embodiment are three in number, and is formed with a corresponding number of outlet ports 32. Each of the extrusion tubes 20 is formed with a side elbow 34 near its upper end, and a flexible tubing 35 connects each extrusion tube elbow 34 with one of the manifold outlets 32. Thus, by controlling the temperature of the chocolate within the receiving tank 18 and the speed of the pump 28, fluid chocolate 36 may be introduced into the extrusion tubes 20 at the desired temperature and rate.

In order to feed a controlled flow of nuts 38 or other solids from the trough 19 into the extrusion tubes 20, the trough is formed with a corresponding number of tubular outlets 39 and a dispensing wheel 40 is rotatably disposed directly below each outlet 39 (FIGS. 1–3). At the lower end of each outlet 39, a guide spout 41 is secured to an L-shaped extension plate 42 of the frame 16 by screws 43. The dispensing wheels 40 are carried by common shaft 45 rotatably supported by the extension plates 42 and each are formed with sidewalls 46 and circumferentially spaced radial fins 48 that define nut receiving compartments 49. The guide spouts 41 each have a curved portion 50 closely surrounding one side of the dispensing wheel and a downwardly inclined lip 51 that terminates over the top opening of a respective one of the extrusion tubes 20. Baffles 52 and 54 are disposed within each trough outlet 39 to direct the flow of nuts from the trough 19 into the dispensing wheel 40 at a position slightly to the left of top center, as viewed in FIG. 2. Upon clockwise rotation of the dispensing wheels 40, again as viewed in FIG. 2, each compartment 49 passes the baffle 54 and is filled with a controlled quantity of nuts 38 which are thereupon carried to a discharge position at the underside of the wheel. The curved section 50 of the guide spout 41 retains the nuts within their compartment until reaching the discharge position. To insure that all nuts that discharge from the wheels 40 are directed into the respective extrusion tubes 20, the upper end of the extrusion tubes are outwardly flared.

To rotatably drive the nut dispensing wheels 40, a sprocket 55 mounted on the shaft 45 is connected to an output shaft 56 of an appropriate variable speed drive motor 58 through a chain 59 and a sprocket 60 carried by the drive shaft 56. The motor 58 preferably is controlled through a dial 61 on the panel 21 so as to permit easy regulation of the rate of nut feed from the trough to the extrusion tubes.

In keeping with the invention, a srew type auger 65 is disposed within each extrusion tube 20 and is adapted for rotational and oscillatory movement to facilitate thorough mixing of the separate streams of liquid chocolate and nuts and to move the combination of ingredients down through the tube to an extrusion point. As best shown in FIGS. 2 and 4, each auger 65 has a central shaft 66 and a helical screw type blade 68 and is supported and driven from an upper end of the shaft 66. In order to drive the augers 65, a pinion shaft 69 is eccentrically coupled to the end of the drive shaft 56. To support the pinion 69, the end of the drive shaft 56 is rotatably supported within an extension plate 70 of the frame 16 and the far end of the pinion is eccentrically mounted within a hub 71 that is rotatably supported in a bushing 72 carried by a second extension frame plate 74. The pinion 69 is formed with longitudinally extending gear teeth that are interrupted by a plurality of longitudinally spaced cylindrical pads 75 that each support an upstanding leg 76 of a yoke shaped auger supporting member 78. To permit rotation of the pinion 69 relative to the yoke 78, a bushing 79 is interposed between each cylindrical pad 75 and the yoke leg 76.

Each auger shaft 66 extends through the support yoke 78 and has a bevel gear 80 secured at its upper end to maintain the auger 65 in depending hanging relation from the support yoke 78 and also to facilitate rotational driving movement of the auger, as will become apparent. Upon operation of the drive motor 58, the drive shaft 56 causes rotational movement of the pinion 69, as well as circular movement as viewed in a vertical plane transverse to the axis of the pinion 69, due to the eccentric mounting of the pinion 69 between the drive shaft 56 and hub 71. This circular movement of the pinion 69 imparts an oscillating type movement to the yoke 78 and the upper ends of augers 65 supported thereby in the sense that they are alternately moved both in an upward and downward and in forward and backward directions. At the same time, the rotational movement of the pinion 69 rotatably drives the bevel gears 80, and thus respective augers 65, through pinions 81 and bevel gears 82 that are mounted on a jack shaft 84 rotatably supported by the yoke legs 76 slightly below the pinion 69. Suitable bearings 85 are mounted within the yoke 78 to facilitate rotational movement of the augers 65 and their associated bevel gears 80 relative to the yoke.

The extrusion tubes 20 in this case are pivotably supported at their lower ends so that their upper ends are permitted slightly forward and backward movement as a result of the oscillating movement of the augers 65. As best shown in FIGS. 5 and 7, the extrusion tubes 20 each are supported by a pair of outwardly extending spring clips 86 that are secured at their innermost ends to a frame 88 by bolts 89. The frame 88 is secured to the machine frame 16 by appropriate means not shown. The outer ends of each spring clip 86 carries a hinge pin 90 adapted to be received in one of two recesses formed in the opposite lower sides of the extrusion tube 20, and the spring bias of the clips 86 maintains the hinge pins 90 in proper position for supporting the tube 20. It will be seen that since each extrusion tube is held only by the pair of spring clips 86 the clips need only be manually separated against the force of the spring bias to allow the lower end of the tube to be pulled forward sufficiently to be removed from the auger 65 for cleaning.

The combined action of the rotation and the up and down movement of the auger 65 relative to the extrusion tube 20 and the simultaneous forward and backward oscillation of the auger 65 and extrusion tube 20 has been found to effectively mix the chocolate 36 and nuts 38 after they are introduced into the extrusion tube and as they travel the length of the tube to the lower extrusion orifice. A one-sixteenth inch off center mounting of the pinion 69 on the drive shaft 56, resulting in a one-eighth inch diameter circular path of movement of the pinion, imparts sufficient oscillatory movement to the auger and tube to effect such mixing. To further insure thorough mixing, in the illustrated embodiment the nuts 38 are added into the top of the tubes 20 and the chocolate 36 is introduced into the side of the tube one or two pitches below the auger top. This arrangement eliminates the possible accumulation of fluid chocolate at the top of the auger upon which nuts might float, and thus, fail to be drawn into the tube by the screw action.

In order to maintain the chocolate 36 that is introduced into the extrusion tube 20 at a temperature so that it is sufficiently fluid to easily mix with the nuts 38 during its travel through the tube, radiant heating strips 91 are provided in closely spaced relation to the heating tubes 20 (FIG. 6). To facilitate transfer of heat to and from the tubes by means of air circulation, the tubes 20 each are formed with a plurality of radial fins 92. Heating of the strips 91, and thus the air immediately surrounding the tubes 20, may be selectively regulated by a dial 93 at the control panel 21 so that the extruded mixture has the desired viscosity. Preferably, the chocolate is introduced into the extrusion tube in as fluid a state as possible and the strips 91 are heated to such a level as to permit limited cooling of the chocolate as it progresses the length of the tube so that it partially sets prior to reaching the extrusion orifice. Such setting of the chocolate enables the extruded mixture to be cut into discrete pieces without excessive running or spreading during cutting or upon deposit onto the conveyor belt 12.

To simultaneously cut the extruded mixture as it emerges from the lower orifice of each of the tubes 20 a plurality of cutting blades 94 are mounted for reciprocating movement directly below the extrusion tubes 20. The cutting blades 94 in this case are supported in tracks 95 for horizontal movement in the direction of travel of the belt 12. The tracks 95 are secured to the frame 88 and extend on opposite sides of each extrusion tube 20 immediately below the bottom thereof. The cutting blades 94 preferably are powered independently of the drive 58 for the augers 65 and may be selectively timed to cut the extrusions into deposits of desired size. To this end, a variable speed drive motor 96, which in this case is located behind the control panel 21 and controlled by a dial 98, has an output shaft 99 that drives a crank shaft 100. The crank shaft 100 is rotatably supported by brackets 101 secured to the extrusion tube support frame 88, and includes a crank arm 102 for each of the cutting blades 94. A connecting rod 104 couples each cutting blade 94 to the respective crank arm 102 so that rotation of the crank shaft 100, and thus the crank arms 102, causes the blades 94 to be simultaneously reciprocated in their tracks 95. Since the cutting blades 94 move in the direction of the belt 12 during their cutting strokes, they impart some limited forward momentum to the extruded cluster 11 as it is being dropped onto the conveyor belt 12 so that the area directly below this belt is clear as the subsequent cluster is extruded.

For the purpose of enhancing the final shape of the resulting cluster 11, the cutting blades 94 each are formed with a forwardmost V-shaped cutting notch 105 with the apex of the V at the center of the blade so that during the forward cutting stroke of the blade the outside surfaces on one side of the descending extrusion tend to be uniformly cut from the outside of the extrusion to the center thereof. Since the extrusion continues to descend during the cutting, the resulting cut piece has a generally conical or rounded upper surface. Because the cut extrusion 11 preferably is only partially set at the time of cutting, once it drops onto the run out belt 12 the bottom surface of the deposit conforms to the flat surface of the belt while the upper surface takes a generally rounded, but irregular and free formed, appearance. Such pieces of confections 11 are indistinguishable from free formed, homemade type confections which heretofore have been produced only by laborious procedures.

In summary, the operation of the machine 10 is as follows. A controlled stream of hot fluid chocolate 36 is fed from the chocolate receiving tank 18 into the side of each of the extrusion tubes 20. The chocolate travels from the receiving tank 18, through the line 26, pump 28, line 29, and into the manifold 30, from which it is directed into the respective extrusion tubes 20 from the flexible manifold outlet tubes 35. A separate stream of nuts 39 is introduced from the trough 19 into the top of each extrusion tube 20 under the control of the dispensing wheel 40 located beneath each trough outlet 39 and driven by the motor 58. Rotation of the auger screws 65, also powered by the motor 58, draws the nuts 38 down into the extrusion tubes 20 to a point where they are joined by the fluid chocolate 36 and the two streams of solids and fluid are mixed and pushed through the extrusion tubes by rotation and up and down movement of each auger 65 relative to its extrusion tube 20 and by the simultaneous forward and backward oscillating movement of the auger 65 and extrusion tube 20. The temperature of the chocolate may be regulated in the extrusion tubes 20 by heating elements 91 so that during travel of the chocolate through the tubes it cools sufficiently to partially set. The cutting blades 94, being independently powered and timed, may thereby sever the extruded mixture into discrete candy pieces 11 of desired size with the V-shaped cutting blade causing the extrusion to be cut with a generally rounded or conical upper shape. When the partially set pieces of confection fall onto the conveyor belt 12, the bottoms of the extrusions take the flat shape of the belt. Due to the adjustable heating means 24 and 91 for the chocolate receiving tank 18 and extrusion tubes 20, respectively, and the independent variable speed drives for the chocolate pump, the auger and nut wheel, and the cutting blades, the proportion of nuts and chocolate, the viscosity of the chocolate, and the size of the extruded cluster may be readily and selectively varied.

In view of the foregoing, it can be seen that the nut clusters 11 are produced by an improved and novel method which is relatively simple and efficient. The method involves basically the steps of continuously feeding a controlled quantity of solids 38 into a mixing zone, such as the extrusion tube 20, continuously feeding a separate controlled quantity of fluid chocolate 36 or other binder into the same mixing zone, mixing said fluid binder and solids in the mixing zone, extruding the mixture from the mixing zone, and successively cutting the extruded mixture into predetermined pieces 11 as they are extruded. Preferably, the temperature of the fluid binder within the mixing zone is controlled so that the binder is caused to partially set prior to being extruded so that discrete pieces of the mixture may be cut which take an irregular shape when dropped upon a moving conveyor surface.

I claim as my invention:

1. A method of making confections of the type having solids held in an irregular free formed cluster by a fluid binder that sets upon cooling comprising the steps of continuously feeding a controlled quantity of said solids into a mixing zone, continuously feeding a separate controlled quantity of said fluid binder into said mixing zone, mixing said fluid binder and solids in said mixing zone while simultaneously moving said mixture through mixing zone and extruding it out an outlet thereof, successively cutting said extruded mixture into predetermined sized pieces as said mixture is extruded, moving a run out conveyor in spaced relation below said mixing zone outlet, and successively dropping said cut pieces of said extruded mixture onto said moving run out conveyor so that the pieces assume an irregular free formed shape.

2. Method of claim 1 including controlling the temperature of the fluid binder within said mixing zone so that the binder of said extruded mixture is caused to partially set prior to cutting.

3. The method of claim 1 including storing a supply of said solids, automatically drawing solids from said supply and feeding said solids into said mixing zone, storing a supply of said fluid binder at a predetermined relatively high temperature, automatically drawing fluid binder from said supply and feeding it into said mixing zone, and cooling said fluid binder when within said mixing zone to a temperature that partially sets the binder.

4. The method of claim 2 including the set of imparting lateral movement to said cut extrusion pieces in the direction of movement of said run out surface during cutting of said pieces.

5. A method of using a confection producing apparatus having a tubular extrusion tube, a screw type auger disposed therein, and a movable conveyor located in spaced relation below an outlet of said tube comprising the steps of continuously feeding a controlled quantity of solids into said extrusion table, continuously supplying into said extrusion tube a separate controlled quantity of a fluid binder which sets when cooled, rotating said auger and simultaneously reciprocating said auger in a longitudinal direction relative to said tube to mix said fluid binder and solids and to extrude said mixture from said tube outlet, successively cutting said extruded mixture into predetermined size pieces and dropping said pieces onto said conveyor so that they assume an irregular free formed shape, and moving said conveyor to transport said formed pieces away from said tube as said extrusion is being cut.

6. Method of claim 5 including feeding said solids into an upper end of said tube and feeding said fluid binder to the side of said tube at a point below the entry of said solids, and controlling the temperature of said fluid binder within said tube so as to cause partial setting of said binder prior to extrusion of said mixture.

* * * * *